Oct. 27, 1942.   F. MUSTAFA   2,300,165
HAND TRUCK
Filed April 13, 1942
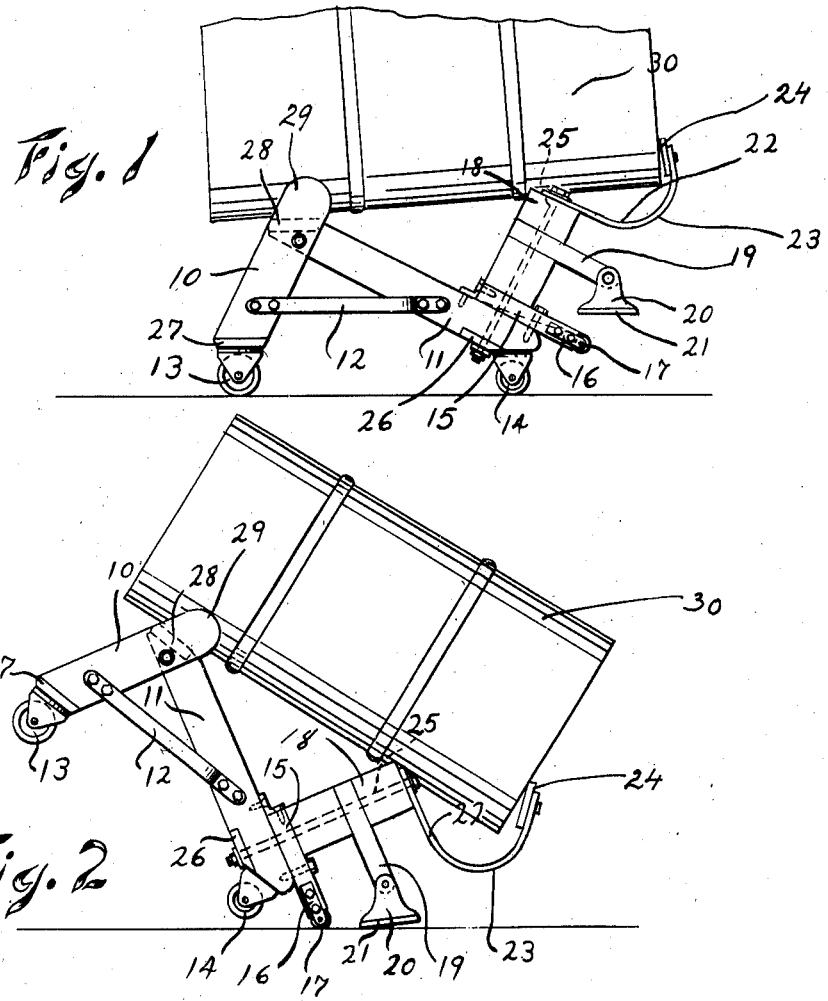
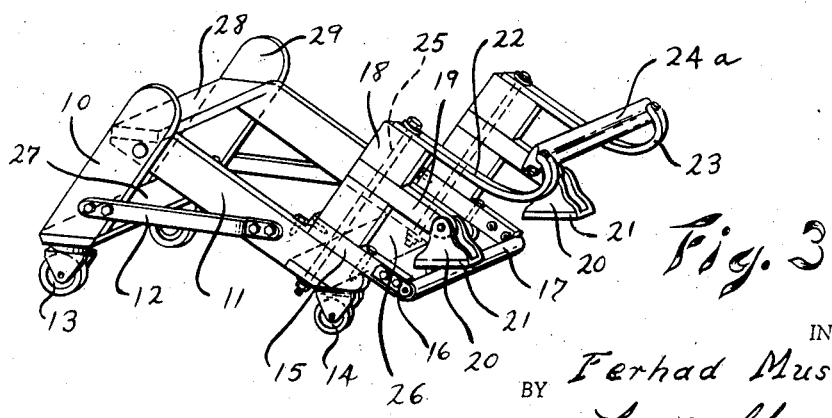
INVENTOR.
Ferhad Mustafa
BY Louis Chayka Patented Oct. 27, 1942

2,300,165

UNITED STATES PATENT OFFICE 2,300,165

HAND TRUCK

Ferhad Mustafa, Detroit, Mich.

Application April 13, 1942, Serial No. 438,685

3 Claims. (Cl. 280—61)

My invention pertains to that kind of trucks which are used in transferring, for short distances, of heavy loads, such as crates, trunks, barrels and other similar objects, where there is more difficulty in loading them upon the truck and later on unloading them, than in conveying them from one place to another. My purpose was to provide a truck of such construction that picking up a load and unloading it would be made simple, easy and requiring the services of one man where ordinarily either more than one person would be required to handle the load, or where handling the load by one person would be strenuous and even dangerous.

Another purpose of my invention was to provide a truck which would also serve as a stand, particularly suitable to support a barrel in a substantially horizontal position so that its contents could be drawn off as required.

Having this end in view, I have built a truck which includes certain novel features of construction and novel combination of parts as will be more fully described with reference to the accompanying drawing in which:

Fig. 1 is a side view of my truck as loaded; Fig. 2 is a side view of the same truck in an inclined position for loading or unloading; Fig. 3 is a perspective view of my truck with one modified part therein.

In describing my truck, I shall first describe one side of it, it being understood that the truck consists of two such sides, suitably joined by transverse members. As seen from the side, the frame of the truck includes two legs, a shorter one 10, and a longer one 11, both being joined to each other at an angle of approximately 90 degrees to form an inverted letter V, the longer leg being inclined towards the front of the truck. The legs are reinforced in their relative position by a horizontally disposed brace 12, and rest on casters 13 and 14, respectively. Mounted on the front end of leg 11, in a parallel abutment thereto but projecting beyond it, is a beam 15 sustaining a transversely positioned round bar 17. The bar is held in place by means of bracket 16 and is preferably held in a fixed position without being able to rotate around its axis.

Rising above said beam, at right angle thereto and to leg 11, is post 18. The midsection of the post comprises a part of another transversely disposed beam 19, projecting outwardly slightly further than the outer end of beam 15. Pivotally suspended from the free end of beam 19 is a shoe 20, the base of which, 21, is always in a horizontal position irrespective of the angle of the beam to the floor on which the truck may rest.

A rigid metal arm, 22, made of narrow band of metal, is affixed to the top of post 18, extending in frontal direction and curving upon itself in an upwardly turned loop 23. The outer end of the arm supports a transverse lifting bar 24. A tying rod 25, shown in dotted lines, serves to hold in place said arm 22, and to bolt post 18 and beam 15 to the front end of leg 11. It will be noted that the truck shown in Fig. 3 is equipped with a modified lifting bar 24a.

Transverse members of my truck forming a part of its frame, are shown in Fig. 3. They include a frontal member 26 between the front legs 11 and two planks binding together the rear legs 10. One of said planks, 27, is disposed between the lower ends of said legs 10, while the other plank 28 is placed somewhat below the upper ends 29 of said legs 10. As said upper ends 29 extend above the surface of plank 28, they serve as guards for the load resting on the truck.

I shall now describe the operation of my truck. As will be seen from the drawing my truck is provided at its front end with a plurality of props or fulcra, adapted to be used successively in order to shift and to vary the length of the arm of force in handling the load. In effect my truck is a three fulcrum truck, one fulcrum being at the point of the front casters, the other in bar 17 and the third one where the upper end of shoe 20 is journalled in beam 19. When the truck is tipped towards the front, the weight of the truck and the load thereon is successively transferred from the first fulcrum to the second and to the third, this order being reversed when the truck is being loaded.

I shall assume now for the purpose of an illustration that a barrel 28 is to be loaded upon my truck, and that the barrel stands on the floor in an upright position. The truck is wheeled on casters 13 and 14 to the barrel, the front of the truck facing same. The barrel is now manually tilted outwardly so that there may be enough room between one side of the bottom of the barrel and the floor to push in the lifting bar 24. The barrel is retained in this position by means of a wedge or by means of some other suitable object. Thereupon the rear part of the truck is raised so that the weight of the truck shifts successively to casters 14, bar 17 and shoes 20. At this stage the outward loop 23, on each side of the truck, touches the floor. The whole truck is now pushed towards the barrel so that bar 24 is under its bottom. Thereupon the operator shoves the barrel towards plank 28 until the upper end of the barrel rests thereon. At this juncture the operator exerts downward pressure on legs 10. The whole weight of the load is shifted to shoes 20 and then in turn to bar 17 and to casters 14, whereupon the center of gravity of the barrel will have shifted sufficiently to force legs 10 to the floor, so that the whole truck rests on the front and the rear casters alone. When the truck is in this position the front of the barrel rests on plank 28 and the lower part of the barrel rests on the upper inner corners of posts 18, as shown in Fig. 1.

Fig. 2 shows the truck in the course of being unloaded, at the stage when the weight of the load is being shifted from bar 17 to shoes 20. In unloading, as will be obvious, the operation is reversed. Assuming that the loaded truck is in position shown in Fig. 1, and that the barrel is to be unloaded, the operator raises the rear part of the truck until, by stages, the weight of the truck is made to rest on shoes 20. The truck is rocked on said shoes until the lower end of the barrel is made to rest partly on the floor and partly on bar 24. A wedge is driven under the bottom of the barrel, or may be placed on the floor in advance so that bar 24 may be easily withdrawn, whereupon the truck may be backed up away from the barrel.

It will be seen that certain changes may be made in the construction of my truck without departing from the inventive idea embodied therein. What I, therefore, wish to claim is as follows:

1. A hand truck comprising a frame on wheels, a member extending beyond the front of the frame close to its base, and forming a transverse prop, beam means on each side of the truck at a level above said prop and extending forwardly beyond the line of its reach, and a transverse lifting bar, disposed forwardly of the frame of the truck and mounted on side arms affixed to the top of said frame.

2. A hand truck of the kind described, comprising a frame on wheels, a transversely positioned bar extending beyond the front of the frame close to the base thereof, a pair of side beams extending beyond the front of the frame at a level above said bar, and provided with pivoted rocker shoes at the outer ends of the respective beams, and a transversely positioned lifting bar at a level above said beams and extending beyond the front of the frame, said lifting bar being mounted by means of side arms on said frame.

3. A hand truck of the kind described, comprising a frame including on each side two legs in an inverted V formation and cross planks to bind same together, a post on each side of the frame at the front thereof and rising upwardly from same, a transversely positioned bar held by means extending beyond the front of the frame close to the base thereof, a pair of beams projecting forwardly from said posts midway their respective ends, a pivoted rocker shoe journalled in the outer end of each beam, and a transverse lifting bar mounted on said frame in front thereof.

FERHAD MUSTAFA.